(12) United States Patent
Zafar

(10) Patent No.: US 6,905,124 B2
(45) Date of Patent: Jun. 14, 2005

(54) UNITIZED SEAL FOR A GAS SPRING

(75) Inventor: Muhammad Salim Zafar, Lake Geneva, WI (US)

(73) Assignee: Trostel Ltd., Lake Geneva, WI (US)

( * ) Notice: Subject to any disclaimer, the term of this patent is extended or adjusted under 35 U.S.C. 154(b) by 0 days.

(21) Appl. No.: 10/217,311

(22) Filed: Aug. 9, 2002

(65) Prior Publication Data

US 2003/0052458 A1 Mar. 20, 2003

Related U.S. Application Data

(60) Provisional application No. 60/312,480, filed on Aug. 15, 2001.

(51) Int. Cl.$^7$ .................................................. F16J 9/20
(52) U.S. Cl. ........................ 277/573; 277/437; 277/575; 267/64.11
(58) Field of Search .................. 188/322.17; 267/64.11; 277/437, 573, 575

(56) References Cited

U.S. PATENT DOCUMENTS

| | | | |
|---|---|---|---|
| 3,368,650 A | * | 2/1968 | Wasdell ................. 188/322.17 |
| 3,856,287 A | * | 12/1974 | Freitag ..................... 267/64.11 |
| 4,030,716 A | | 6/1977 | Freitag |
| 4,078,778 A | | 3/1978 | Hubweber |
| 4,240,619 A | | 12/1980 | Wirges et al. |
| 4,261,583 A | * | 4/1981 | de Vries et al. ............. 277/550 |
| 4,307,873 A | | 12/1981 | Mölders |
| 4,309,026 A | | 1/1982 | Reuschenbach et al. |
| 4,310,148 A | | 1/1982 | Freitag |
| 4,316,098 A | | 2/1982 | Freitag et al. |
| 4,317,014 A | | 2/1982 | Langanke |
| 4,373,707 A | | 2/1983 | Mölders |
| 4,445,671 A | | 5/1984 | Reuschenbach et al. |
| 4,466,514 A | | 8/1984 | Mölders et al. |
| 4,467,899 A | | 8/1984 | Mölders et al. |
| 4,553,761 A | * | 11/1985 | Blesing et al. ............... 277/553 |
| 4,565,380 A | * | 1/1986 | Newman et al. ............. 277/616 |
| 4,632,228 A | | 12/1986 | Oster et al. |
| 4,632,371 A | | 12/1986 | Wirges et al. |

(Continued)

FOREIGN PATENT DOCUMENTS

| | | |
|---|---|---|
| DE | 1971284 | 10/1967 |
| DE | 29723414 | 9/1998 |
| DE | 19822805 | 12/1999 |
| EP | 0 362 815 A2 * | 4/1990 |
| GB | 2267131 | 11/1993 |
| WO | WO 99/01679 * | 1/1999 |

Primary Examiner—Alison K. Pickard
(74) Attorney, Agent, or Firm—Quarles & Brady LLP

(57) ABSTRACT

A unitized seal for use in a gas spring seal assembly. The unitized seal includes a rigid thermoplastic insert having an elastomeric sealing layer surrounding the insert and bonded to the insert. The insert provides rigidity to the seal and includes a central, axial opening that receives and guides a rod slidably engaged with the insert. The sealing layer engages the interior surface of the gas spring cylinder to prevent the pressurized gas contained within the gas spring from escaping around the seal. The sealing layer also includes a central, axial opening aligned with the passage in the insert that slidably engages the rod and further prevent gas from escaping the gas spring cylinder. The unitized seal may be formed in a single or two-step process. In the single step process, the insert and sealing layer are formed by injection molding processes in a single mold and are bonded to one another by a subsequent covulcanization process. In the two-step process, the insert is formed in a first injection molding step, and has an adhesion promoter applied to the exterior of the insert. The coated insert is then placed within a second mold that is used to form the sealing layer about the insert in a subsequent injection molding process. The adhesion promoter intimately bonds the sealing layer to the insert forming the unitized seal.

19 Claims, 2 Drawing Sheets

U.S. PATENT DOCUMENTS

| | | | |
|---|---|---|---|
| 4,650,165 A | 3/1987 | Siemann | |
| 4,750,594 A | 6/1988 | Siemann et al. | |
| 4,896,587 A | 1/1990 | Mintgen | |
| 4,909,488 A | 3/1990 | Seibert et al. | |
| 4,934,668 A | 6/1990 | Vassmer | |
| 4,944,498 A | 7/1990 | Körtgen et al. | |
| 4,948,104 A | 8/1990 | Wirges | |
| 4,973,097 A | 11/1990 | Hosam et al. | |
| 4,993,522 A | 2/1991 | Wagner | |
| 5,041,715 A | 8/1991 | Müller | |
| 5,042,625 A | 8/1991 | Maus | |
| 5,042,782 A | 8/1991 | Mintgen | |
| 5,074,390 A | 12/1991 | Fuhrmann et al. | |
| 5,127,497 A * | 7/1992 | Struckmeyer et al. | 277/575 |
| 5,275,387 A * | 1/1994 | Cotter et al. | 267/64.11 |
| 5,346,230 A | 9/1994 | Schumacher et al. | |
| 5,485,987 A | 1/1996 | Jobelius et al. | |
| 5,735,371 A | 4/1998 | Jobelius et al. | |
| 6,003,848 A * | 12/1999 | Cotter et al. | 267/64.11 |
| 6,164,659 A * | 12/2000 | Netzer et al. | 277/437 |
| 6,511,075 B1 * | 1/2003 | Schmidt | 277/436 |

\* cited by examiner

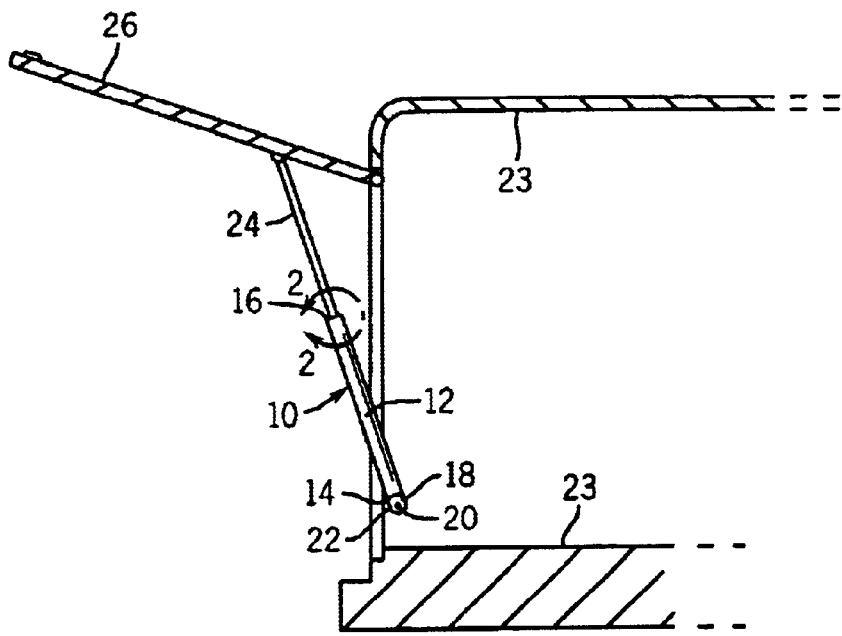
FIG. 1
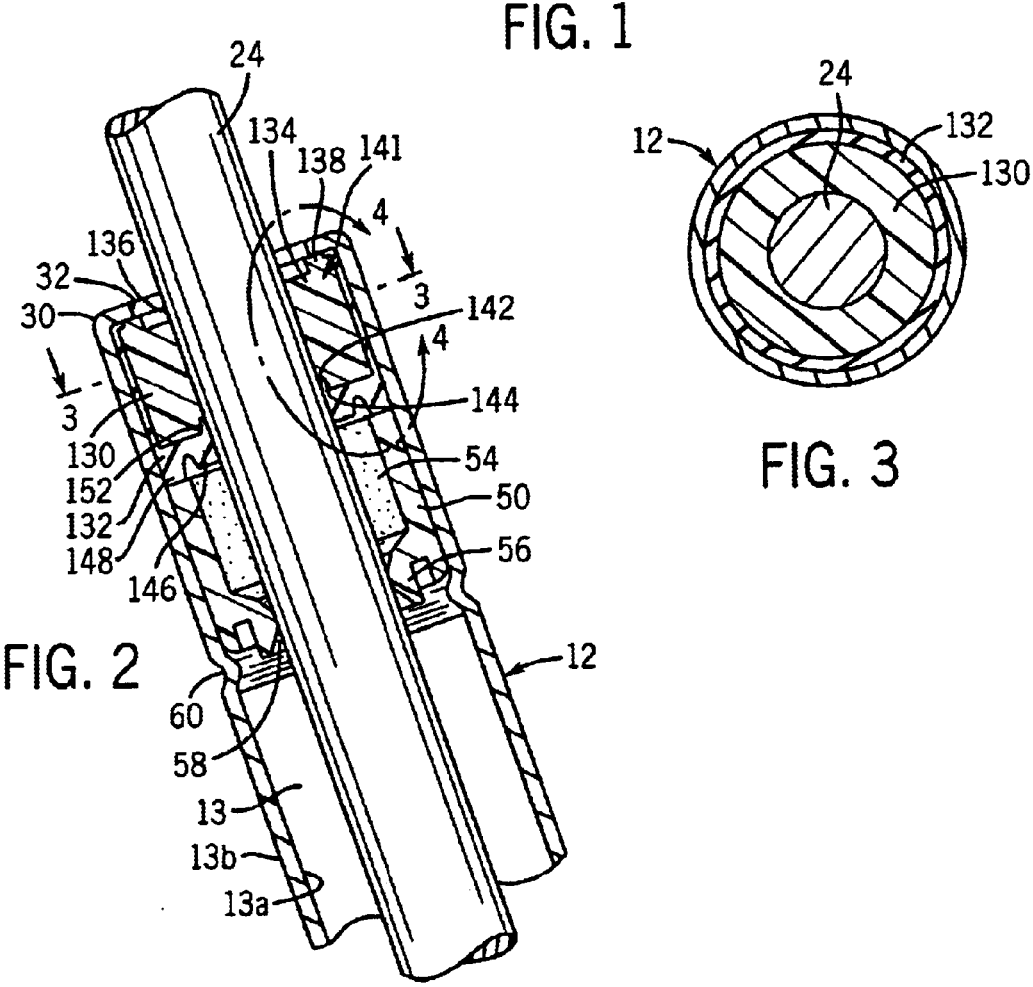
FIG. 2
FIG. 3

UNITIZED SEAL FOR A GAS SPRING

CROSS REFERENCES TO RELATED APPLICATIONS

This application claims priority to U.S. Provisional Patent Application No. 60/312,480 filed on Aug. 15, 2001.

STATEMENT REGARDING FEDERALLY SPONSORED RESEARCH

Not Applicable.

FIELD OF THE INVENTION

The present invention relates to gas springs and more specifically to a unitized seal for a seal assembly used in containing the gas and lubricating fluid within the gas spring.

BACKGROUND OF THE INVENTION

Gas springs are used in a variety of applications to selectively position a movable member with respect to a static member. The gas spring is formed from a hollow cylinder having an open end and a closed end. The closed end is typically attached to the static member, such as through a pivotable mounting arrangement, so as to provide a stable base for the gas spring. The open end of the cylinder defines a circular opening that is adapted to receive an elongated rod, which includes an outer end adapted for connection to the movable member. The rod extends through the opening into the cylinder, and includes an inner end which is mounted to a piston located within a piston cavity defined by the hollow cylinder. The piston is movable within the piston cavity in response to extension and retraction of the rod caused by movement of the movable member relative to the stationary member. In this manner, the operative length of the gas spring is controlled by the length of the piston cavity, which entails the majority of the length of the cylinder.

The rod extends into the interior of the cylinder through a sealing arrangement that serves to retain a volume of pressurized gas, such as nitrogen, and lubricating fluid within the cylinder. The pressurized gas acts on the piston to control the movement of the rod with respect to the cylinder and to selectively maintain the rod in position relative to the cylinder. The sealing arrangement is positioned adjacent the open end of the cylinder. In a prior art construction, the sealing arrangement includes a rod guide, a washer, a first fluid seal and a second fluid seal.

In the prior art construction the rod guide is positioned immediately against the open end of the cylinder and defines a central opening through which the rod extends. The rod guide is formed of a generally rigid material that serves to retain the rod in proper axial alignment with respect to the open end of the cylinder such that the rod may slide freely through the open end.

Opposite the open end, a metal washer is positioned against the rod guide. The metal washer is formed of a rigid metal such as low carbon steel in a process separate from the formation of the remainder of the sealing arrangement. To retain the metal washer in position within the sealing arrangement, after its manufacture the washer is treated with a zinc phosphate coating which allows a subsequent adhesive coating applied between the sealing arrangement components and the metal washer to adhere the washer to the components of the sealing arrangement. The washer provides stiffness and support to the sealing arrangement and maintains the axial and radial position of the sealing arrangement when used in a dynamic gas spring application. Furthermore, because the washer is made of a rigid metal, the washer is less permeable to nitrogen gas than the rest of the sealing arrangement and acts as a barrier between the nitrogen gas inside the cylinder and the exterior of the cylinder.

The first fluid seal is positioned against the metal washer opposite the rod guide. The first seal includes a central opening aligned with the opening in the rod guide and sealingly engages the interior surface of the cylinder about its circumference. The first seal also sealingly engages the rod as the rod extends through the central opening to prevent a lubricant, that coats the exterior of the rod, and the pressurized gas from escaping from the cylinder.

The second fluid seal abuts the first fluid seal opposite the washer. The second seal defines a lubricating fluid reservoir having a central bore aligned with the opening in the first seal through which the rod extends. The reservoir is closed opposite the bore by the first seal and is filled with the lubricant that coats the exterior surface of the rod. This construction allows the rod to slide freely through the opening in the first seal, the bore in the second seal and the opening in the rod guide. The second seal also sealingly engages the rod and the interior surface of the cylinder to maintain the pressurized gas within the piston cavity.

The sealing arrangement is retained in position against the open end of the cylinder by a crimp in the cylinder body that abuts the second seal adjacent the bore. The crimp extends inwardly a sufficient distance to prevent the sealing arrangement from sliding along the interior surface of the cylinder away from the open end.

To develop a washer supported elastomeric seal, a zinc phosphate coating is initially applied to the metal washer. The elastomeric seal is then molded over the washer in a controlled environment and the bonding is achieved during the curing process of the elastomer. To assemble the sealing arrangement in a gas spring, the components, such as rod guide, first seal, and second seal, are positioned against each other in a desired configuration to form a specific sealing arrangement. The sealing arrangement may then be positioned as a whole within a particular gas spring assembly.

While providing a reliable sealing arrangement for the gas spring, this prior art sealing arrangement has certain drawbacks. First, the multitude of parts comprising the sealing arrangement requires a slow and complex process in order to properly assemble the sealing arrangement. Second, bonding of the metal washer to the first seal involves a meticulous process in order to achieve a bond strength that is adequate to meet the functional requirements of the sealing arrangement. This process greatly increases the cost of production of the sealing arrangement and slows the overall production of the sealing arrangements. Finally, the structure of the prior art sealing arrangement may allow a certain amount of the pressurized gas held within the cylinder to permeate through the sealing arrangement and escape from the cylinder, which adversely effects the ability of the gas spring to function in the desired manner.

Therefore, it is desirable to develop a seal assembly for use in a gas spring that does not require the expensive and complex process of bonding elastomeric parts to metal parts within the assembly. The seal assembly should contain a minimum of individual parts overall, which should be able to be produced in a fast and efficient manner. Further the seal assembly should be formed in such a manner as to greatly reduce the permeability of the pressurized gas through the seal assembly to extend the useful life of a gas spring in which the seal assembly is utilized.

SUMMARY OF THE INVENTION

It is an object of the invention to provide a gas spring seal assembly which incorporates individual parts of prior art gas spring seals into a single, unitized seal.

It is another object of the invention to provide a gas spring seal assembly in which the unitized seal performs each of the functions of the parts that it replaces.

It is still another object of the invention to provide a gas spring seal assembly that has a reduced permeability to the pressurized gas within the gas spring to extend the useful life of a gas spring cylinder in which the gas spring seal assembly is utilized.

It is still a further object of the invention to provide a gas spring seal assembly in which the unitized seal can be quickly and inexpensively formed using a single stage manufacturing process.

The present invention is an improved gas spring seal assembly that functions similarly to the prior art seals and utilizes a unitized part which incorporates various parts of prior art seals into a single seal. The unitized seal includes a substantially rigid insert molded integrally within an outer resilient sealing layer. In one form, the insert may be made of a thermoplastic material and the resilient sealing layer may be made of an elastomeric material. The thermoplastic insert and elastomeric sealing layer can be unitarily formed in a single stage operation in which the elastomeric layer is molded about the insert. The insert and elastomeric layer are securely bonded to one another during this process due to the reactivity of the curing elastomer, negating the need for any adhesive to be applied to the exterior of the insert. Further, the bonding between the insert and the elastomeric layer is enhanced by the covulcanization of the insert 5 and the elastomeric layer.

The thermoplastic insert in the unitized seal abuts the open end of the cylinder to properly position the seal. The insert defines a central opening that abuts and slidably engages the exterior surface of the rod, to axially align the rod with the open end of the gas spring cylinder and to guide movement of the rod relative to the cylinder. The insert, being formed of a rigid material, also serves to provide rigidity to the seal assembly and has a reduced permeability to the pressurized gas within the cylinder.

The elastomeric layer generally surrounds the exterior of the insert and sealingly engages the interior surface of the gas spring cylinder to retain the pressurized gas within the cylinder. The portion of the elastomeric layer disposed opposite the open end of the cylinder includes an opening aligned with the opening in the insert. The rod extends through the opening, and the elastomeric material sealingly engages the rod at the opening to prevent the rod lubricant and pressurized gas from passing through the seal assembly. With this construction, the rod guide and the first fluid seal of the prior art construction are combined into a single, unitized seal assembly which reduces manufacturing and assembly costs yet which effectively performs the functions of such components.

The seal assembly can also includes a reservoir seal abutting the unitized seal opposite the open end. The reservoir seal is constructed similarly to the second fluid seal of the prior art construction. The reservoir seal includes a circular opening positioned opposite the unitized seal and aligned with the openings in the seal through which the rod extends into the interior of the gas spring cylinder. The reservoir seal further defines a central interior space that holds the lubricant that coats the exterior surface of the rod and facilitates the sliding movement of the rod with respect to the seal assembly.

Various other features, objects and advantages of the invention will be made apparent from the following detailed description taken together with the drawings.

BRIEF DESCRIPTION OF THE DRAWINGS

The drawings illustrate the best mode presently contemplated of carrying out the invention.

FIG. 1 is an isometric view of an enclosure employing a gas spring constructed in accordance with the invention, to releasably secure a pivotal portion of the enclosure in an open position;

FIG. 2 is an enlarged partial cross-sectional view of the portion of the gas spring indicated by line 2—2 of FIG. 1;

FIG. 3 is a cross-sectional view along line 3—3 of FIG. 2;

DETAILED DESCRIPTION OF THE INVENTION

Figure 4:
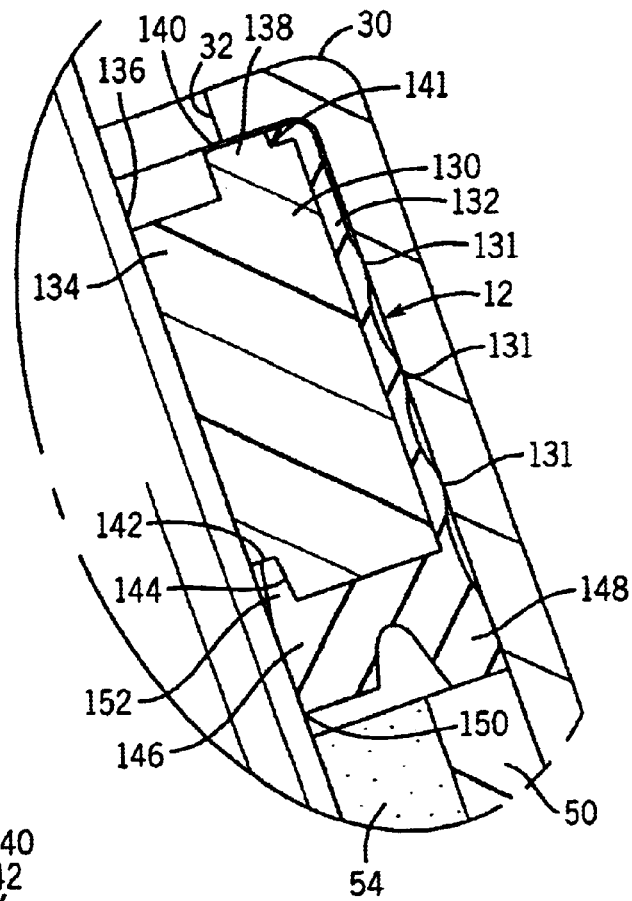
FIG. 4 is an enlarged partial cross-sectional view of the portion of the gas spring indicated by line 4—4 of FIG. 2.

With reference now to the drawings in which like reference numerals designate like parts throughout the disclosure, FIG. 1 illustrates a gas spring indicated generally at 10 constructed according to the invention. Referring to FIGS. 1 and 2, gas spring 10 includes a body 12, such as a cylinder or pressure tube, having a piston cavity 13 defined by an inner surface 13a, in a manner as is known. Tube 12 further defines an outer surface 13b, a closed end 14 and an open end 16. The closed end 14 includes an outwardly extending flange 18 that includes a hole 20 that is adapted to receive a screw 22 or other fastening device to pivotally secure the closed end 14 of the tube 12 to a structure 23. The spring 10 also includes a rod 24 slidably engaged with the tube 12 through the open end 16 and pivotally secured opposite the tube 12 to a door 26 that is hingedly connected to the structure 23. The open end 16 is formed by an inwardly curving end wall 30 of tube 12 that defines a rim 31 having a circular opening 32 therein. The diameter of the opening 32 is larger than the diameter of the rod 24, such that the rod 24 can be inserted through the opening 32 into the interior of the pressure tube 12. It should be understood that the environment for gas spring as illustrated in FIG. 1 is simply one representative use for gas spring 10, and that gas spring 10 may be employed in any application in which one member is movable relative to another and it is desired to control relative movement and positioning of the members.

Figure 5:
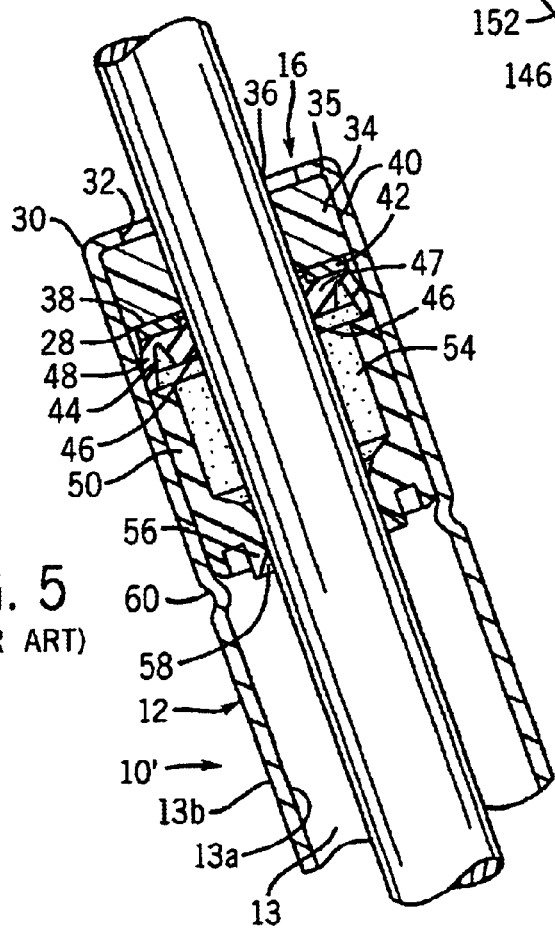
FIG. 5 is a cross-sectional view similar to FIG. 2, showing a prior art sealing arrangement for a gas spring.

Referring now to FIG. 5, a prior art sealing arrangement 28 is shown for a gas spring 10', which includes certain components similar to gas spring 10 as set forth above and as illustrated in FIGS. 1 and 2. Like reference characters will be used where possible to facilitate clarity. As shown in FIG. 5, sealing arrangement 28 of gas spring 10' is located immediately adjacent the open end 16 of the tube 12.

The sealing arrangement 28 includes a rod guide 34 positioned within the tube 12 that abuts the inwardly curving end wall 30. The guide 34 has an upper wall 35 that conforms to the shape of the end wall 30, and defines a central, axial passage 36 adapted to receive the rod 24. Guide 34 further includes a flat lower wall 38 and a side wall 40 connecting the upper wall 35 and lower wall 38. The passage 36 has a diameter slightly larger than that of the rod 24 in order to enable to the rod 24 to pass through the passage 36 while preventing the rod 24 from moving laterally within the passage 36. The exterior diameter of the guide 34 conforms to the diameter of the inner surface 13a of the tube 12 to provide a snug fit for the guide 34 within the tube 12. The guide 34 is formed of a rigid, thermosetplastic material and serves to axially align the center of the rod 24 with the center of the tube 12 to ensure proper positioning of the rod 24 with respect to the tube 12 during the operation of the gas spring 10'.

Opposite the open end 16, a washer 42 engages the lower wall 38 of the guide 34. The washer 42 is formed of a metal, such as low carbon steel, and has an inner diameter larger than that of the passage 36 in the guide 34 to allow the rod 24 to pass freely through the center of the washer 42. The washer 42 is supported by the lower wall 38 of the guide 34 and provides rigidity to the sealing arrangement 28 to maintain the components of the sealing arrangement 28 in alignment with each other.

Opposite the guide 34, the washer 42 abuts and is secured to a first fluid seal 44. The first seal 44 is formed of an elastomeric material, such as rubber, and has a central circular opening 46 that is aligned with the axial passage 36 in the guide 34. The opening 46 is defined by an inwardly extending inner rim 47 on the first seal 44 that sealingly engages the rod 24 as the rod passes through the opening 46. The first seal 44 also includes an angularly outwardly extending outer lip 48 that contacts and sealingly engages the inner surface 13a of the tube 12 when the sealing arrangement 28 is positioned within the tube 12.

To form the prior art seal arrangement 28, a zinc phosphate coating is first applied to the metal washer 42. Then, washer 42 and sealing member 44 are bonded during the molding process to each other as they are shown in arrangement 28. Bonding the washer 42 and sealing member 44 ensures that the components of the prior art seal arrangement 28 have a sufficient bond strength to remain in engagement with each other during operation of the gas spring 10' to prevent significant leakage of gas or lubricant around or through the sealing arrangement 28.

Once the sealing arrangement 28 is assembled, an oil reservoir and seal 50 is adhered to the sealing arrangement 28 against the first fluid seal 44. The reservoir 50 is generally cylindrical in shape, defining a volume 52 in the center of the reservoir 50 and having an outer diameter approximately equal to the diameter of the inner surface 13a of the tube 12. The volume 52 of the reservoir 50 is filled with a lubricant 54 that coats the exterior of the rod 24, enabling the rod 24 to slide smoothly through the reservoir 50, the opening 46 in the first seal 44 and the opening 36 in the rod guide 34. The volume 52 is partially closed opposite the first seal 44 by a sealing lip or skirt 56 extending inwardly from the end of the reservoir 50. The skirt 56 defines a central, axial opening 58 through which the rod 24 is inserted. When inserted through the opening 58, the rod 24 deflects the skirt 58 such that the skirt 56 sealingly engages the rod 24. The lubricant 54 is thus prevented from leaking out of the reservoir 50 by the sealing engagement of the reservoir 50 with the first seal 44, and of the rod 24 with the skirt 56 and first seal 44.

The sealing arrangement 28 and reservoir 50 are retained in position within the tube 12 by an inwardly extending rib or crimp 60 formed in the tube 12 that engages the reservoir 50 opposite the seal arrangement 28. The crimp 60 prevents the arrangement 28 and reservoir 50 from sliding along the tube 12 and disengaging from one another.

FIGS. 2–4 illustrate the improved unitized seal assembly 128 of the present invention as incorporated into gas spring 10. The gas spring 10 has a similar construction to gas spring 10' of FIG. 5 and as described above, including a tube 12 having a closed end 14 and an open end 16 including a curved end wall 30, a rod 24 slidably engaged with the tube 12 through the open end 16, and a reservoir and seal 50 positioned within the tube 12 adjacent the open end 16 for holding an amount of a lubricant 54 and slidably engaged with the rod 24.

The unitized seal assembly 128 is disposed between the open end 16 and the reservoir 50 and includes an inner rod guide or aligning insert 130 and an outer sealing section or layer 132. The inner aligning insert 130 is generally cylindrical in shape and formed of a rigid, thermoplastic material such as polyamide of hexamethylenediamine and n-dodecanedioic acid manufactured by Creanova Engineering Plastic under the trade name Vestamid (PA612). The insert 130 includes an inner reduced diameter portion 134 that defines an axial passage 136, and an outer enlarged diameter portion 138 having generally flat opposite ends 140. Inner reduced diameter portion 134 defines an inner ring section which extends inwardly from an outer ring section defined by outer enlarged diameter portion 138. The outer diameter of the insert 130 is slightly less than that of the tube 12 such that a space remains between the insert 130 and the inner surface 13a of the tube 12. The end 140 adjacent the open end 16 of the tube 12 has a circumferential notch 141 that is filled by an inwardly extending lip area of the sealing layer 132 to secure the bond between insert 130 and sealing layer 132, and to enhance the sealing engagement of the seal assembly 128 with the tube 12. The intersection of the inner portion 134 and outer portion 138 at each end of the insert 130 defines a circular recess 142 around the passage 136 that terminates in an annular shoulder 144 at the outer edge of the recess 142. When properly positioned within the tube 12, the end 140 of the outer portion 138 adjacent the open end 16 engages the inwardly curving end wall 30 to assist in retaining the seal assembly 128 in position within the tube 12.

The outer sealing layer 132 of the seal assembly 128 is integrally formed about inner aligning insert 130 and overlays substantially the entire enlarged diameter portion 138 of the insert 130, including the exterior wall of the enlarged diameter portion 138, the end 140 opposite the open end 16 of the tube 12, the annular shoulder 144 opposite the open end 16 and the end 140 adjacent the open end 16 up to and including the notch 141. The section of the enlarged diameter portion 138 not covered by the outer sealing layer 132 is the portion of the end 140 adjacent the open end 16 inside of the notch 141 which engages the inwardly curving end wall 30 of the tube 12. The outer sealing layer 132 is formed of an elastomeric material that is intimately bonded to the inner aligning insert 130 during the process for forming the seal assembly 128. The sealing layer 132 fills the space between the insert 130 and the tube 12, engaging the inner surface 13a of the tube 12 around the insert 130 to prevent any lubricant or pressurized gas from passing the sealing layer 132 and exiting the tube 12 through the open end 16.

Opposite the open end 16, the sealing layer 132 includes an inwardly extending inner sealing lip 146 and an outwardly extending outer sealing lip 148. The outer lip 148 extends radially outwardly at an angle and contacts the inner surface 13a of the tube 12 when the seal assembly 128 is positioned within the gas spring 10. The outer lip 148 deflects inwardly against the bias of the elastomeric material forming the sealing layer 132 upon contact with the tube 12 to provide a reliable fluid-tight seal between the outer lip 148 and the inner wall 13a of the tube 12.

The inner lip 146 defines a circular aperture 150 that is alignable with the axial passage 136 in the insert 130. The inner lip 146 extends radially inwardly at an angle opposite to the angle of the outer lip 146, such that when the rod 24 is inserted through the seal assembly 128, the inner lip 146 is contacted and deflected by the rod 24 to provide a fluid tight seal between the inner lip 146 and the rod 24. To ensure that the inner lip 146 and aperture 150 are properly aligned with the opening 136 in the insert 130, the inner lip 146 further includes a stub ring 152 that extends inwardly towards the insert 130 and engages the adjacent annular shoulder 144. By engaging the annular shoulder 144, the ring 152 properly positions the inner lip 146 around the passage 136 to ensure that the aperture 150 in the inner lip 146 sealingly engages the rod 24 when the rod 24 is inserted through the aperture 150. Ring 152 also functions to secure the bond between insert 130 and sealing layer 132.

As mentioned previously, the seal assembly 128 comprises the insert 130 and sealing layer 132 which are formed of separate thermoplastic and elastomeric materials, respectively, that are intimately bonded to one another in either a two step or a single stage process.

In the two-step process of forming the seal assembly 128, the insert 130 is manufactured in a conventional injection molding process. Once the insert 130 has been formed, the insert 130 is removed from the injection mold and has an adhesion promoter applied to the exterior surface of the insert 130. The adhesion promoter is allowed to dry and the insert 130 is then positioned within a second mold. In the second mold, the sealing layer 132 is formed around the insert 130 in a subsequent insert-type injection molding process. The sealing layer 132 adheres to the adhesion promoter on the insert 130 as it cures and forms the unitized seal assembly 128.

Alternatively, the seal assembly 128 can be formed in a single step process. In the single step process, the insert 130 and sealing layer 132 are formed in two consecutive injection molding processes using a single mold, and simultaneously undergo covulcanization after the formation of both components. The covulcanization process uses reactivity of the elastomeric material forming the sealing layer 132 as it cures to adhere the insert 130 and sealing layer 132 to each other to form the seal assembly 128. This single step process can be performed using a rotational mold or a rotatable plate mold and is suitable for short vulcanization times and long runs.

In assembly, the rod 24 is inserted through the opening 16 of the tube 12 into the piston cavity 13 to retain a volume of pressurized gas therein. The crimp 60 is then formed in the tube 12 at the proper location to restrict the movement of the reservoir seal 50 and seal assembly 128. The reservoir seal 50 is then positioned about the rod 24 and slid into position against the crimp 60 within the tube 12. Once the reservoir seal 50 is in position, the reservoir seal 50 is filled with the lubricant 54. The unitized seal assembly 128 may then be positioned about the rod 24 and slid into position against the reservoir 50 to sealingly engage the tube 12 and the reservoir seal 50 to prevent the escape of any lubricant 54 or pressurized gas from the piston cavity 13 within the tube 12. The open end 16 of the tube 12 is then bent inwardly to sealingly engage the seal assembly 128 and to retain the assembly 128 within the tube 12.

In operation, as the rod 24 slides in and out of the open end 16 of the tube 12, based on the pivotal movement of the door 26, the inner lip 146 on the sealing layer 132 of the seal assembly 128 sealingly engages the exterior of the rod 24 to prevent any lubricant 54 on the rod 24 or pressurized gas from escaping from the tube 12 through the passage 136 in the assembly 128. Simultaneously, the outer lip 148 of the sealing layer 132 sealingly engages the interior surface 13a of the tube 12 and the reservoir seal 50 to prevent any lubricant 54 or pressurized gas from escaping around the exterior of the assembly 128. The seal assembly 128 also functions to align and guide the rod 24 into and out of the tube 12 by the engagement of the rod 24 with the rigid insert 130.

The unitized seal assembly 128 of the present invention greatly reduces the time and expense needed to construct a seal assembly for a gas spring 10' or 10 illustrated in the drawing figures by combining separate components of a prior art seal assembly 28 into a single unitized assembly 128 which performs each of the functions of the prior art components. The unitized seal assembly 128 is formed using an injection molding process which is capable of forming the assembly 128 in less time and at a reduced cost as compared to that for the prior art seal arrangement 28. The assembly 128 also functions at least as reliably as the prior sealing arrangement 28 to retain the lubricant 54 and the pressurized gas within the tube.

While the embodiments disclosed in the detailed description presently show the best mode of making and using the unitized seal assembly 128 of the present invention, other possible alternative constructions of the assembly 128 are also possible. For example, the insert 130 may be formed with a constant radial thickness about the passage 136 and a groove in one end 140 for receiving the stub ring 152 to secure the sealing layer 132 about the insert 130. Furthermore, the sealing layer 132 may be formed in a variety of different configurations, for example, including a solid lip that performs the functions of both the inner lip 146 and outer lip 148, or a second stub ring that secures the sealing layer 132 to the end 140 of the insert 130 adjacent the open end 16. Also, the insert 130 may include protrusions on the exterior of the insert 130 that create ridges 131 (shown in FIG. 4 ) in the sealing layer 132 to increase the sealing engagement of the assembly 128 with the inner surface 13 a of the tube 12.

Various alternatives and embodiments are contemplated as being within the scope of the following claims particularly pointing out and distinctly claiming the subject matter regarded as the invention.

I claim:

1. A unitized seal for a gas spring assembly including a body member defining an internal cavity and a rod adapted to be slidably received within the internal cavity of the body member, comprising:

a substantially rigid guide member having an outer diameter and defining a passage adapted to slidably receive the rod, said passage including a shoulder, and said guide member defining a transverse dimension less than that of the body member so as to define a space therebetween; and a resilient sealing material bonded directly to the guide member, said resilient sealing material overlaying substantially all of said outer diameter and including ridges for engaging the body member, wherein the resilient material is located within the space, and said sealing material includes inwardly extending inner lip structure and outwardly extending outer lip structure for engaging the rod and the body member, respectively, and said sealing material defines a stub ring engaging said shoulder to properly position said inwardly extending inner lip structure for sealingly engaging the rod.

2. The unitized seal of claim 1, wherein the sealing material and guide member are bonded to one another by a covulcanization process.

3. The unitized seal of claim 1, wherein the sealing material and guide member are bonded to one another by an adhesive.

4. The unitized seal of claim 1, wherein the guide member is formed of a rigid material.

5. The unitized seal of claim 4 wherein the guide member is formed of a thermoplastic material.

6. The unitized seal of claim 1, wherein the sealing material is formed of an elastomeric material.

7. The unitized seal of claim 6 wherein the sealing material is formed of rubber.

8. The unitized seal of claim 1, wherein the guide member is generally cylindrical in shape and defines the axial passage within which the rod is slidably received.

9. The unitized seal of claim 1, wherein the sealing material includes an inwardly extending sealing lip that defines an aperture axially aligned with the passage in the guide member, wherein the inwardly sealing lip extends inwardly to sealingly engage the rod inserted through the aperture.

10. The unitized seal of claim 1, wherein the guide member defines an outer wall, a pair of spaced end walls, and an inner wall, and wherein the resilient sealing material overlies the outer wall, at least one of the end walls, and at least a portion of each of the inner wall and the other one of the end walls.

11. The unitized seal of claim 1, in which at least one end of said insert includes a circumferential notch, and said sealing material extends into said notch.

12. A unitized seal for a gas spring assembly including a body member defining an internal cavity and a rod adapted to be slidably received within the internal cavity of the body member, comprising:

a substantially rigid guide member having an outer diameter and defining a passage adapted to slidably receive the rod, wherein the guide member defines a transverse dimension less than that of the body member so as to define a space therebetween; and a resilient sealing material bonded directly to the guide member and overlaying substantially all of said outer diameter and includes ridges for engaging the body member, wherein the resilient material is located within the space, and said sealing material includes inwardly extending inner lip structure and outwardly extending outer lip structure for engaging the rod and the body member, respectively, wherein the guide member defines an outer wall, a pair of spaced end walls, and an inner wall, and wherein the resilient sealing material overlies the outer wall, at least one of the end walls, and at least a portion of each of the inner wall and the other one of the end walls.

13. The unitized seal of claim 4, in which at least one end of said guide member includes a circumferential notch, and said sealing material extends into said notch.

14. A gas spring assembly comprising:

an elongated body including an open end and a closed end, the open end including an end wall defining a central opening;

a rod slidably mounted within the body and extending through the central opening;

a reservoir disposed adjacent the open end of the body, the reservoir defining a chamber adapted to receive a lubricant and including an axial opening adapted to receive and slidably engage the rod; and a unitary seal disposed between the open end of the body and the reservoir, the seal including an insert having an outer diameter and a sealing section disposed around substantially all of said outer diameter of the insert, wherein the insert defines a central, axial passage including a shoulder adapted to receive and slidably engage the rod and an end of said insert adjacent said open end includes a circumferential notch, and said sealing section extends into said notch, and wherein the sealing section is bonded to the insert and sealingly engages the body and the rod, and, wherein said sealing section defines an inwardly extending lip and a stub ring, said stub ring engaging said shoulder to properly position said inwardly extending lip for sealingly engaging said rod.

15. The gas spring assembly of claim 14, in which said sealing section includes ridges for engaging the body.

16. The gas spring assembly of claim 14, wherein the sealing material is bonded to the guide member by a covulcanization process.

17. The gas spring assembly of claim 14, wherein the sealing material is bonded to the guide member by an adhesive.

18. The gas spring assembly of claim 14, wherein the guide member is formed of a rigid material.

19. The gas spring assembly of claim 14, wherein the sealing material is formed of an elastomeric material.

* * * * *